(12) United States Patent
Tu

(10) Patent No.: US 7,637,026 B2
(45) Date of Patent: Dec. 29, 2009

(54) MAIN ROTOR BLADE CALIBRATION GAUGE FOR REMOTE-CONTROLLED TOY HELICOPTER

(76) Inventor: Ta-Sen Tu, No. 345, Shuiyuan Rd., Fengyuan City, Taichung County (TW)

( * ) Notice: Subject to any disclaimer, the term of this patent is extended or adjusted under 35 U.S.C. 154(b) by 136 days.

(21) Appl. No.: 12/073,746

(22) Filed: Mar. 10, 2008

(65) Prior Publication Data

US 2009/0223073 A1    Sep. 10, 2009

(51) Int. Cl.
*G01B 5/24* (2006.01)
(52) U.S. Cl. ....................................................... 33/530
(58) Field of Classification Search ................... 33/530
See application file for complete search history.

(56) References Cited

U.S. PATENT DOCUMENTS

| | | | | |
|---|---|---|---|---|
| 1,547,380 A | * | 7/1925 | Godfrey | 33/530 |
| 2,170,824 A | * | 8/1939 | Lichtenwalner | 33/368 |
| 2,737,722 A | * | 3/1956 | Keim | 33/286 |
| 2,749,623 A | * | 6/1956 | La Barre, Jr. et al. | 33/530 |
| 3,996,670 A | * | 12/1976 | Joyal et al. | 33/530 |
| 4,146,967 A | * | 4/1979 | Rohner et al. | 33/530 |
| 6,644,081 B1 | * | 11/2003 | Berry | 72/31.11 |
| 7,472,489 B2 | * | 1/2009 | Frank | 33/530 |

* cited by examiner

*Primary Examiner*—Christopher W Fulton
(74) *Attorney, Agent, or Firm*—Rosenberg, Klein & Lee

(57) ABSTRACT

A main rotor blade calibration gauge is disclosed to include a graduation plate with an angle scale, a calibration plate pivoted to one end of the graduation plate, and chuck plates coupled to the calibration plate for securing the calibration plate to the main rotor blade of the remote-controlled toy helicopter to be adjusted for allowing the angle of the main rotor blade to be calibrated subject to the indication of a pointer at the calibration plate relative to the angle scale at the graduation plate.

2 Claims, 3 Drawing Sheets

MAIN ROTOR BLADE CALIBRATION GAUGE FOR REMOTE-CONTROLLED TOY HELICOPTER

BACKGROUND OF THE INVENTION

1. Field of the Invention

The present invention relates to a calibration gauge and more particularly, to a main rotor blade calibration gauge for calibrating the main rotor blade of a remote-controlled toy helicopter.

2. Description of the Related Art

A remote-controlled toy helicopter generally comprises a main rotor blade and a flybar paddle. After a certain period in use, the angle of the main rotor blade may be biased. Biasing of the main rotor blade will cause unstable flying of the remote-controlled toy helicopter. When the main rotor blade of a remote-controlled toy helicopter is biased, calibration is necessary. Conventionally, the calibration of the main rotor blade is performed subject to visual check and experience. Calibration in this manner is difficult to achieve high precision. People may use a rule or scale to assist the calibration. However, it is inconvenient to calibrate the angle of the main rotor blade of a remote-controlled toy helicopter with a rule or scale.

SUMMARY OF THE INVENTION

The present invention has been accomplished under the circumstances in view. It is therefore the main object of the present invention to provide a main rotor blade calibration gauge, which is calibrates the angle of the main rotor blade of a remote-controlled toy helicopter accurately. It is another object of the present invention to provide a main rotor blade calibration gauge, which is easy and convenient to operate.

To achieve these and other objects of the present invention, the main rotor blade calibration gauge comprises a graduation plate, the graduation plate comprising an opening on a middle part thereof, a first mounting through hole and a second mounting through hole disposed at two opposite lateral sides relative to the opening, and an angle scale; a calibration plate, the calibration plate comprising an axle hole disposed near one end thereof, a pointer disposed near an opposite end thereof for aiming at the angle scale of the graduation plate, an elongated sliding slot extending along a length thereof in X-axis direction between the axle hole and the pointer, and an arched slot extending along a width thereof in Y-axis direction between the elongated sliding slot and the pointer; a pivot bolt fastened to the first mounting through hole and the axle hole to pivotally secure the calibration plate to the graduation plate; a lock screw inserted through the arched slot and fastened to the second mounting through hole to releasably lock the calibration plate to the graduation plate; and two chucking plates attached to front and back sides of the calibration plate and secured to the elongated sliding slot with a screw and movable along the elongated sliding slot for chucking the main rotor blade of a remote-controlled toy helicopter for calibration.

DETAILED DESCRIPTION OF THE PREFERRED EMBODIMENT

Figure 1:
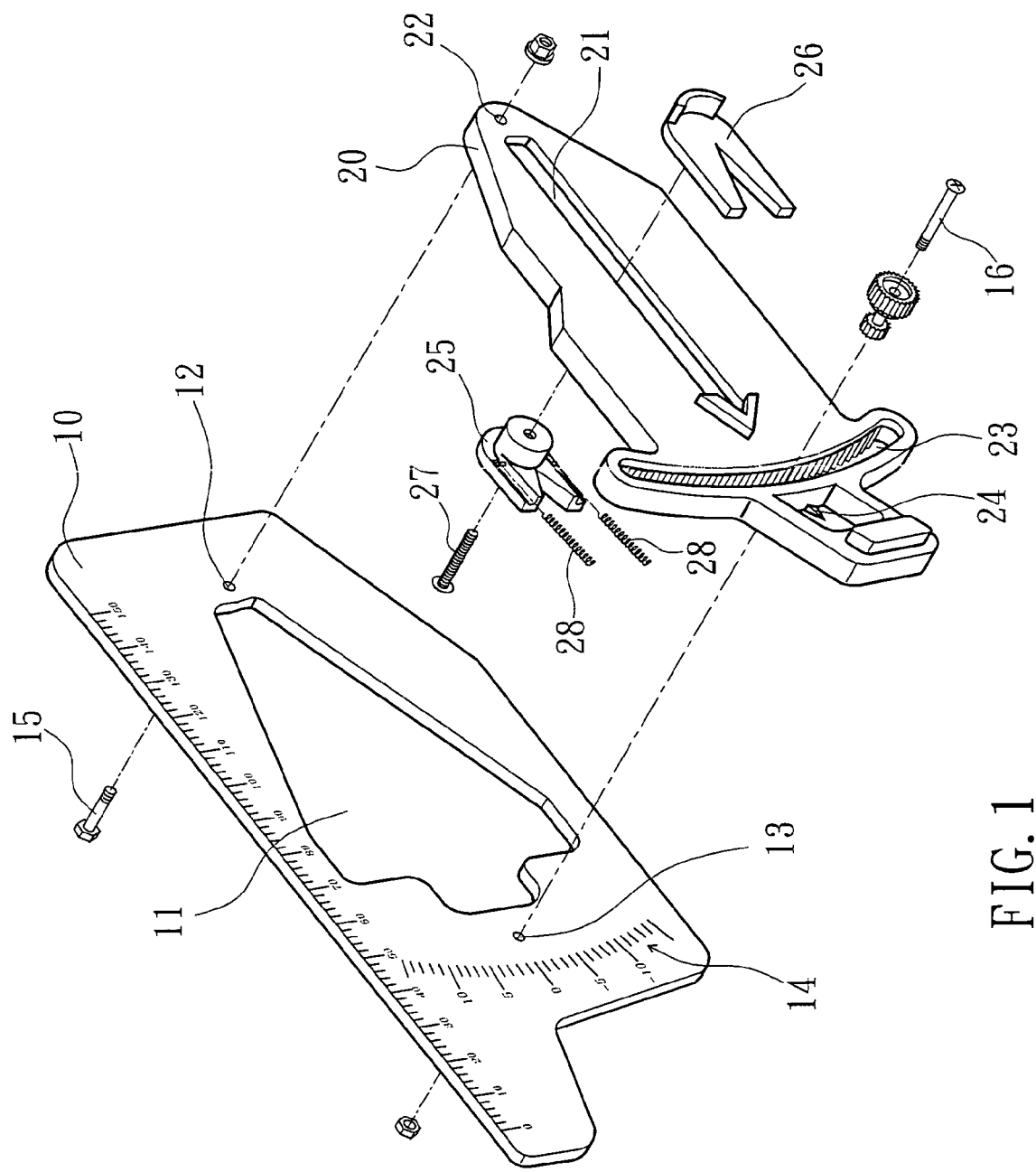
FIG. 1 is an exploded view of a main rotor blade calibration gauge for remote-controlled toy helicopter in accordance with the present invention.

Referring to FIGS. 1~5 a main rotor blade calibration gauge in accordance with the present invention is shown comprising a graduation plate 10, a calibration plate 20, and two chucking plates 25 and 26.

The graduation plate 10 has an opening 11 on the middle, a first mounting through hole 12 and a second mounting through hole 13 disposed at two opposite lateral sides relative to the opening 11, and an angle scale 14. The calibration plate 20 has an axle hole 22 disposed near one end, a pointer 24 disposed near the other end, an elongated sliding slot 21 extending along the length in X-axis direction between the axle hole 22 and the pointer 24, and an arched slot 23 extending along the width in Y-axis direction between the elongated sliding slot 21 and the pointer 24. A pivot bolt 15 is fastened to the first mounting through hole 12 and the axle hole 22 to pivotally secure the calibration plate 20 to the graduation plate 10. A lock screw 16 is inserted through the arched slot 23 and fastened to the second mounting through hole 13 to lock the calibration plate 20 to the graduation plate 10. When loosened the lock screw 16, the user can bias the calibration plate 20 to adjust the angle of the calibration plate 20 relative to the graduation plate 10. The two chucking plates 25 and 26 are attached to the front and back sides of the calibration plate 20 and secured to the elongated sliding slot 21 with a screw 27. Further, spring members 28 are connected between one end of the chucking plate 25 and one end of the calibration plate 20. The chucking plates 25 and 26 can be moved along the elongated sliding slot 21 for chucking the main rotor blade 30 of a remote-controlled toy helicopter.

Figure 2:
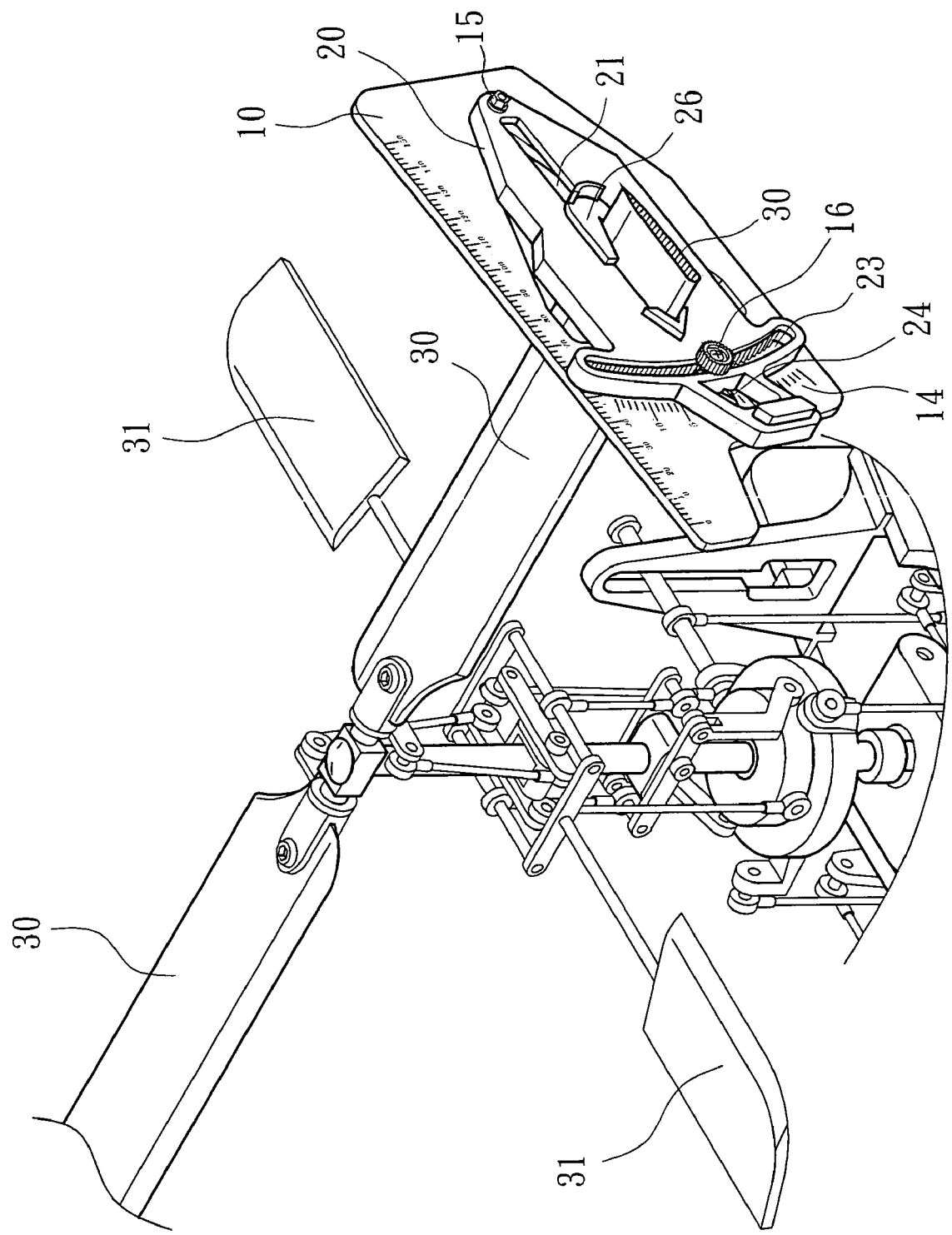
FIG. 2 is an applied view of the present invention, showing the main rotor blade calibration gauge attached to the main rotor blade of a remote-controlled toy helicopter.
Figure 3:
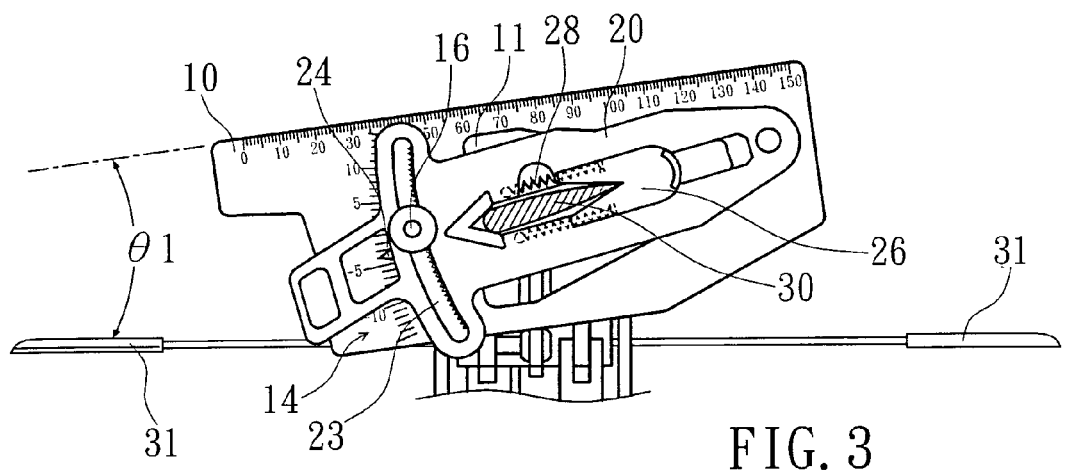
FIG. 3 is a schematic drawing of the present invention, showing the main rotor blade calibration gauge at the initial status during a calibration operation.
Figure 4:
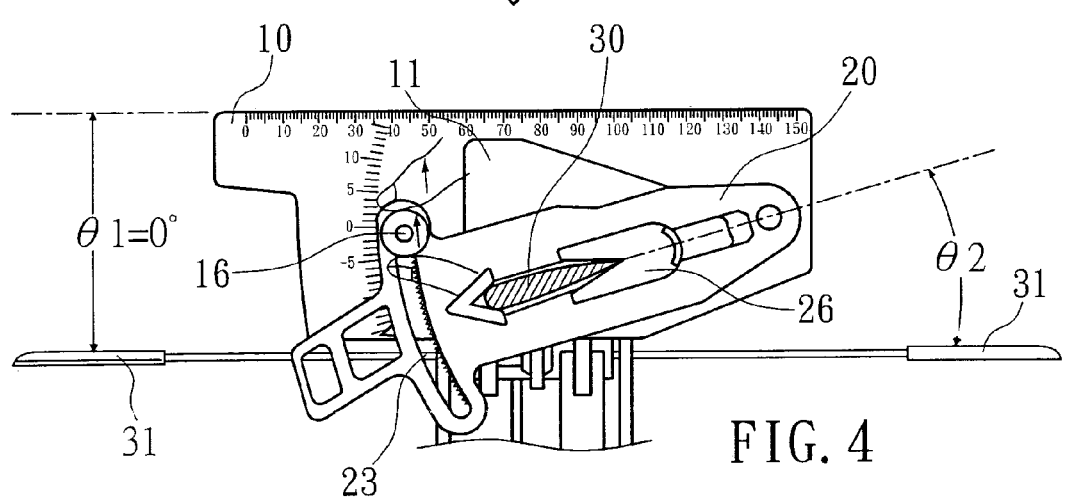
FIG. 4 corresponds to FIG. 3, showing the measurement of the abnormal biasing angle of the main rotor blade.
Figure 5:
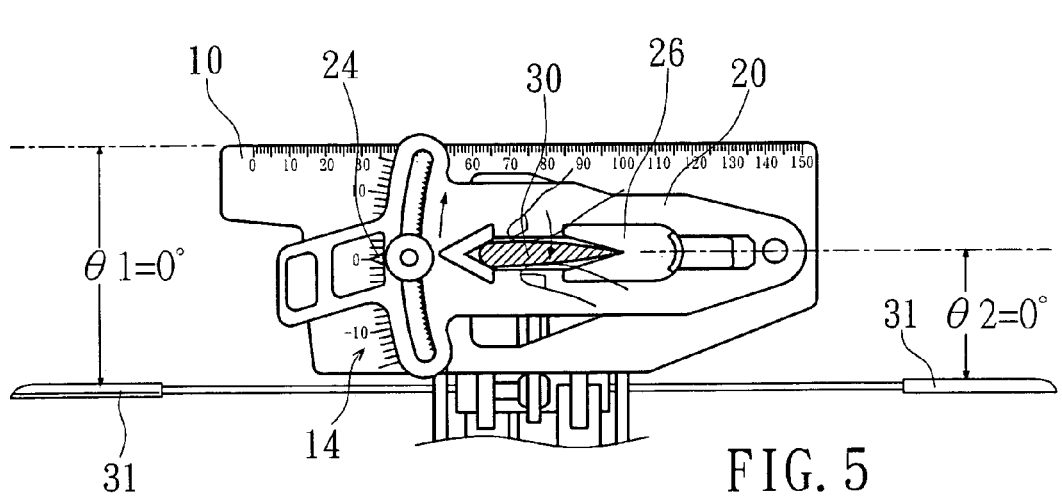
FIG. 5 corresponds to FIG. 4, showing biasing angle of the main rotor blade calibrated.

When calibrating the main rotor blade 30 of a remote-controlled toy helicopter, as shown in FIGS. 2 and 3, pull the chucking plates 25 and 26 along the elongated sliding slot 21 for allowing the main rotor blade 30 of the remote-controlled toy helicopter to be inserted through the elongated sliding slot 21 of the calibration plate 20, and then release the hand from the chucking plates 25 and 26 for enabling the chucking plates 25 and 26 to hold down the main rotor blade 30. At this time, the flybar paddle 31 is kept at an angle $\theta 1$ relative to the graduation plate 10. The user can then move the lock screw 16 upwards along the arched slot 23 of the calibration plate 20 to move the graduation plate 10 to the reference position in parallel to the flybar paddle 31, i.e., $\theta 1 = 0°$, as shown in FIG. 4, knowing the abnormal biasing angle $\theta 2$ of the calibration plate 20. At this time, as shown in FIG. 5, the user can adjust (twist) the main rotor blade 30. When adjusting (twisting) the main rotor blade 30, the chucking plates 25 and 26 are turned with the main rotor blade 30, and therefore the calibration plate 20 is relatively moved. When the calibration plate 20 is moved to the position where the pointer 24 points out the zero reading 0° at the angle scale 14, the calibration is done.

As stated above, the calibration of the main rotor blade 30 can be done easily by: chucking the main rotor blade calibration gauge to the main rotor blade 30, and then moving the graduation plate 10 to the reference position in parallel to the flybar paddle 31, and then adjusting the main rotor blade 30 to have the pointer 24 point out the zero reading 0° at the angle scale 14.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A main rotor blade calibration gauge comprising:
   a graduation plate, said graduation plate comprising an opening on a middle part thereof, a first mounting through hole and a second mounting through hole disposed at two opposite lateral sides relative to said opening, and an angle scale;
   a calibration plate, said calibration plate comprising an axle hole disposed near one end thereof, a pointer disposed near an opposite end thereof for aiming at said angle scale of said graduation plate, an elongated sliding slot extending along a length thereof in X-axis direction between said axle hole and said pointer, and an arched slot extending along a width thereof in Y-axis direction between said elongated sliding slot and said pointer;
   a pivot bolt fastened to said first mounting through hole and said axle hole to pivotally secure said calibration plate to said graduation plate;
   a lock screw inserted through said arched slot and fastened to said second mounting through hole to releasably lock said calibration plate to said graduation plate; and
   two chucking plates attached to front and back sides of said calibration plate and secured to said elongated sliding slot with a screw and movable along said elongated sliding slot for chucking the main rotor blade of a remote-controlled toy helicopter for calibration.

2. The main rotor blade calibration gauge as claimed in claim 1, further comprising spring means connected between one end of said chucking plate and one end of said calibration plate.

\* \* \* \* \*